United States Patent
Shapiro

(10) Patent No.: US 6,543,894 B1
(45) Date of Patent: Apr. 8, 2003

(54) CONVERTIBLE EYEGLASSES

(76) Inventor: Sam Shapiro, 163 Urick La., Monroeville, PA (US) 15146

( * ) Notice: Subject to any disclaimer, the term of this patent is extended or adjusted under 35 U.S.C. 154(b) by 0 days.

(21) Appl. No.: 09/696,604

(22) Filed: Oct. 25, 2000

(51) Int. Cl.[7] ............................................... G02C 11/02
(52) U.S. Cl. ......................................... 351/52; 351/47
(58) Field of Search .............................. 351/51, 52, 47, 351/91, 57; 63/1.11, 1.18, 900

(56) References Cited

U.S. PATENT DOCUMENTS

| | | | | |
|---|---|---|---|---|
| 2,743,543 A | * | 5/1956 | Goddard | 351/52 |
| 2,835,063 A | * | 5/1958 | Worthington | 351/52 |
| 3,517,415 A | * | 6/1970 | McGrath et al. | 351/52 |
| 5,181,051 A | * | 1/1993 | Townsend et al. | 351/52 |
| 5,886,765 A | * | 3/1999 | Kirschner | 351/52 |
| 6,139,144 A | * | 10/2000 | Hanansky | 351/52 |

FOREIGN PATENT DOCUMENTS

| | | | | |
|---|---|---|---|---|
| EP | 0 357 523 | * | 3/1990 | 351/52 |
| JP | 60-21024 | * | 2/1985 | 351/91 |
| JP | 62-95514 | * | 5/1987 | 351/91 |

OTHER PUBLICATIONS

The translation of JP 60—21024 (Motozuka), Feb., 1985.*

* cited by examiner

*Primary Examiner*—Huy Mai
(74) *Attorney, Agent, or Firm*—Jones, Tullar & Cooper, P.C.

(57) ABSTRACT

Eyeglasses are converted in appearance by a cover clip-on for part of the front portion of the frame of the eyeglasses. A set of eyewear combines the eyeglasses with the cover clip-on. The set may be enlarged by provision of a sunglasses clip-on and/or temple coverlets. A cover clip-on can mask the top and bottom eye rims of the eyeglasses or have a strip form, with top eye rim cover sections, possibly interconnected by a bridge. The strip is assembled with the eyeglasses mechanically and/or magnetically.

8 Claims, 6 Drawing Sheets

CONVERTIBLE EYEGLASSES

TECHNICAL FIELD

The invention relates to eyewear, particularly to devices for altering the appearance of eyeglass frames and to sets comprised of one or more such devices coupled with a primary frame and lenses, and, in some cases, a clip-on sunglasses or other accessories.

BACKGROUND ART

My U.S. Pat. No. 6,089,707 discloses CONVERTIBLE EYEGLASSES. In that patent, I provide means for converting ordinary eyeglasses to sunglasses stylishly.

DISCLOSURE OF INVENTION

An object of this invention is to provide means by which a primary frame and lenses can be given different looks for different occasions. For instance, one may desire a business-like appearance during working hours and then a more striking or glamorous appearance for a dinner date. Neither case ordinarily requires the wearing of sunglasses.

Achievement of this and other objects of the invention is provided according to the invention by cover clip-ons for a part of the front portion of the primary frame. These clip-ons mask a front portion of the primary frame to a view from the front and preferably also sideways, for instance from the top.

The covers of the invention, in masking a portion of the primary frame, may alter the visual effect of the eyewear in a large number of ways. Thus, the covers may differ from the primary frame in color, in material, in mottling and marbling, in texture, in shape, and any of the large number of other means used by fashion designers to achieve unique looks.

Cellulose acetate (zyl) is a preferred material of construction for the covers. Other frame materials, such as light nylon (TR 90), may be used as well. A frame material guide is presented at:

EYECARE BUSINESS—ISSUE—OCTOBER 2000—PAGE 74.

The cover clip-ons of the invention may attach to the primary frame using the various techniques applied for connecting sunglass clip-ons to a primary frame. Other techniques, not used for sunglass clip-ons, may also be used.

In a preferred form of the invention, the cover clip-ons of the invention are in the form of a strip having two top eye rim cover sections interconnected by a bridge.

The present invention may be supplemented, as well, with the temple coverlets of my above-referenced U.S. Pat. No. 6,089,707. By combining the temple coverlets with the frame front portion cover clip-ons of the present invention, it is possible to convert the appearance of the majority of the primary frame. The invention further includes sets comprised of one or more of the cover clip-ons of the present invention coupled with a primary frame and lenses, and a clip-on sunglasses. My U.S. Pat. No. 6,089,707 shows coordination of a primary frame and lenses with a clip-on sunglasses. For these reasons, the entire U.S. Pat. No. 6,089,707 is incorporated here by reference.

BRIEF DESCRIPTION OF DRAWINGS

In the accompanying drawings, which show a number of embodiments of the invention as examples, in which like parts bear like reference characters.

MODES OF THE INVENTION

Figure 1:
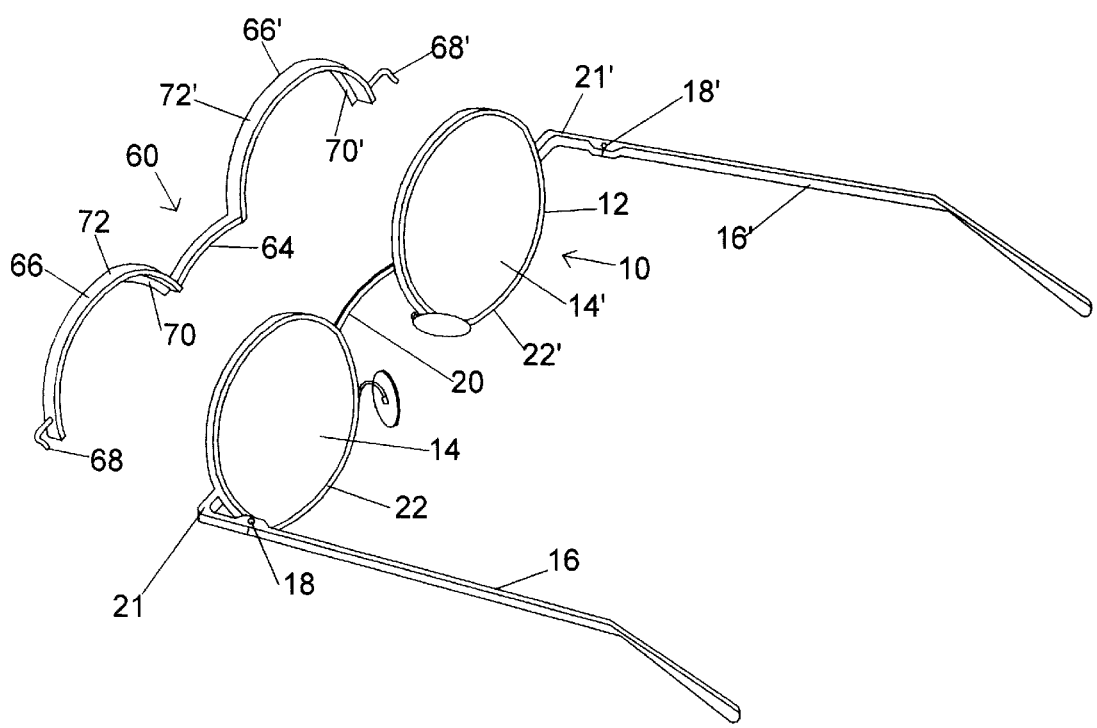
FIGS. 1 and 8–11 are exploded perspective views of eyewear sets of the present invention.

The primary eyeglasses of FIG. 1 include frame 10 with frame front portion 12, a pair of eyeglass lenses 14, 14', left and right temples 16,16', and left and right hinges 18,18'. Front portion 12 holds the pair of eyeglass lenses 14, 14' in spatial alignment with respect to each other and, during use, also with respect to the eyes of the eyeglass wearer. Front portion 12 includes bridge section 20 connecting left and right eyeglass rim sections 22, 22', and left and right end pieces 21,21' on the outer sides of the left and right eyeglass rim sections 22,22'. Left and right temples 16, 16' are pivotally attached to front portion 12 by, respectively, left and right hinges 18, 18' thereby allowing left and right temples 16, 16' to be folded inwardly to make eyeglass frame 10 more compact when not in use. The front portion 12 and the left and right temples 16, 16' are preferably made of metal but may be made of any material or combination of materials known to one skilled in the art.

The embodiment of FIG. 1 also includes a cover clip-on 60 of the present invention. Clip-on 60, which is configured to clip onto the front portion 12 of frame 10, comprises a bridge clip 64, left and right rim sections 66, 66', and left and right retainer clips 68, 68'. The rim sections 66, 66' are preferably made of plastic material and are most preferably made of zyl.

Bridge clip 64 connects left and right rim sections 66, 66'. Bridge clip 64 and left and right retainer clips 68, 68' cooperate to permit cover clip-on 60 to be detachably attached to cover the top eye rim sections of frame front portion 12. Bridge clip 64 may be any type of a resilient metal clip known to one skilled in the art that is adaptable to releasably engage eyeglass frame bridge section 20 so as to aid in the retention of cover clip-on 60 to eyeglass front portion 12.

In this embodiment, left and right retainer clips 68, 68' rearwardly extend, respectively, from the ends of the left and right rim sections 66, 66'. In use, left and right retainer clips 68, 68', respectively, engage left and right end pieces 21,21' of front portion 12 to mechanically attach cover clip-on 60 to frame 10. Left and right retainer clips 68, 68' preferably have a hook-shape and are made of a resilient metal. However, they may be any clip of any material and design known to one skilled in the art that is capable of being adapted to releasably engage the right and left end pieces of front portion 12 so as to cooperate with bridge clip 64 to detachably attach cover clip-on 60 to eyeglass frame front portion 12.

The conversion of the primary eyeglasses in this embodiment of FIG. 1 is accomplished by attaching cover clip-on 60 to eyeglass front portion 12. Attachment of clip-on 60 to eyeglass front portion 12 may be accomplished by first hooking one of the retainer clips 68, 68', respectively, on its respective end piece of front portion 12, then rotating cover clip-on 60 into frontal alignment with eyeglass front portion 12 while bringing resilient bridge clip 64 under and beneath bridge section 20, then lifting the remaining retainer clip up and onto its end piece. Reconversion of the converted eyeglasses to the primary eyeglasses is accomplished by reversing the described procedure. The set of eyewear of FIG. 1 comprised of primary eyeglasses and cover clip-on may be supplemented by inclusion of the clip-on sunglasses shown in the drawing of my U.S. Pat. No. 6,089,707, whereupon a multipurpose 3-IN-1 (trademark) set of eyewear is achieved for the invention.

Further details of cover clip-on 60 and its assembled relationship to primary eyeglasses will now be treated. First, it will be noted from closer observation of FIG. 1 that the rim sections 66,66' include frontal lips 70,70' and roofs 72,72'. In assembly with the primary eyeglasses, the lips mask the top eye rims of front portion 12 from view from the front, while the roofs mask the top eye rims of front portion 12 from view from the top.

Figure 2:
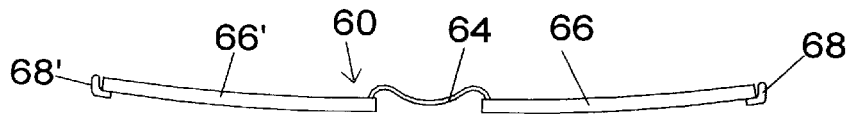
FIGS. 2 and 3 are top and front views of the cover clip-on of FIG. 1.
Figure 3:
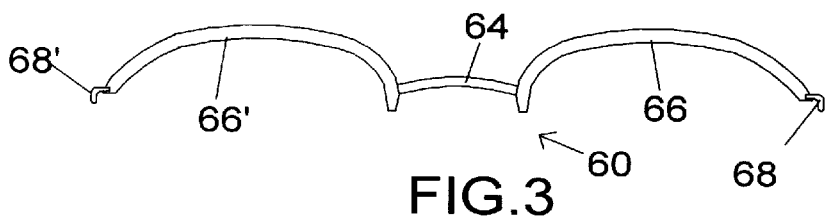

FIGS. 2 and 3 provide top and front views, respectively, of the cover clip-on 60 of FIG. 1, showing bridge clip 64, left and right rim sections 66, 66', and left and right retainer clips 68, 68'. Either of these views emphasizes the character of this embodiment of the invention, that it is essentially in the form of a strip having two top eye rim cover sections interconnected by a bridge.

Figure 4:
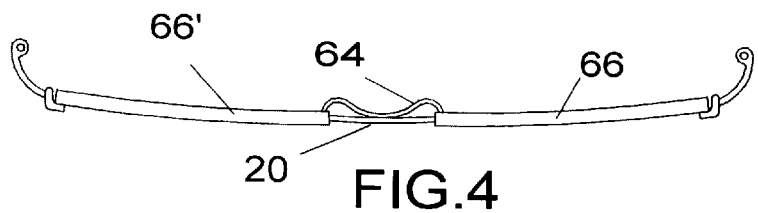
FIGS. 4–6 are top, front, and side views of the clip-on of FIGS. 2 and 3 assembled with a primary eyeglasses.
Figure 5:
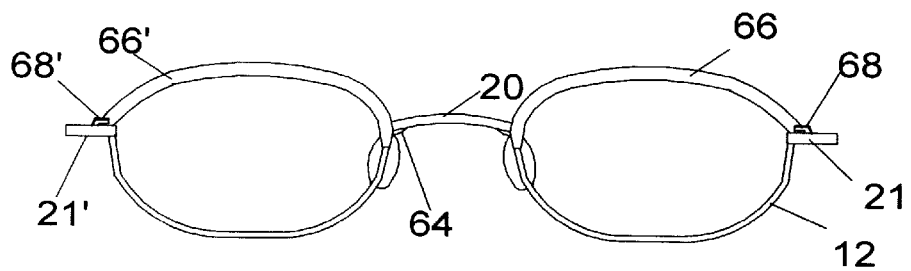
Figure 6:
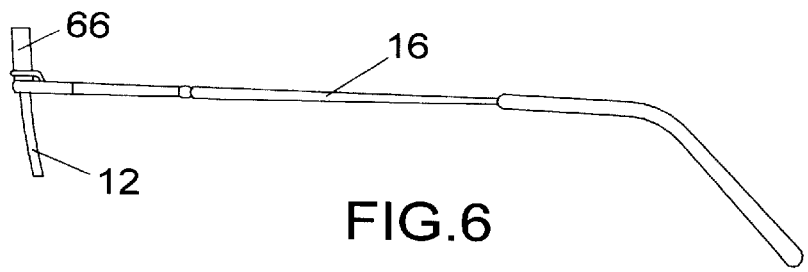

FIGS. 4 to 6 are top, front, and side views of the cover clip-on 60 assembled with primary eyeglasses. Bridge clip 64 is hooked under bridge section 20, left and right rim sections 66, 66' are masking the top eye rims of front portion 12, and left and right retainer clips 68, 68' are hooked onto the end pieces 21,21'. In this hooked engagement with the primary eyeglasses, cover clip-on 60 has been resiliently bent to conform to, and cover, the top eye rims of the primary eyeglasses. The resulting spring tension keeps clip-on 60 attached to the primary eyeglasses, until it is intentionally removed.

Figure 7:
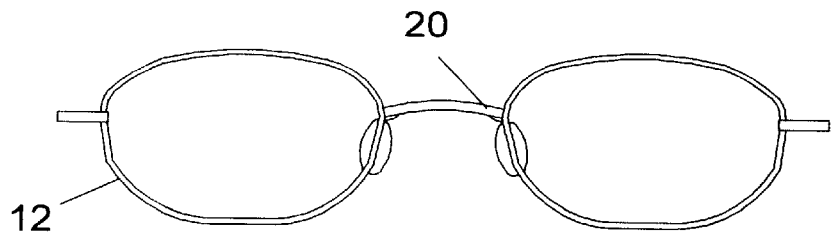
FIG. 7 is a front view of a primary eyeglasses.

FIGS. 7 and 5 provide a before and after comparison, respectively, of primary eyeglasses and primary eyeglasses converted by the present invention, as observed in front view. It is understood, of course, that fashion designers will be able to embellish the cover clip-on of the invention to provide an immense variety of looks.

Figure 8:
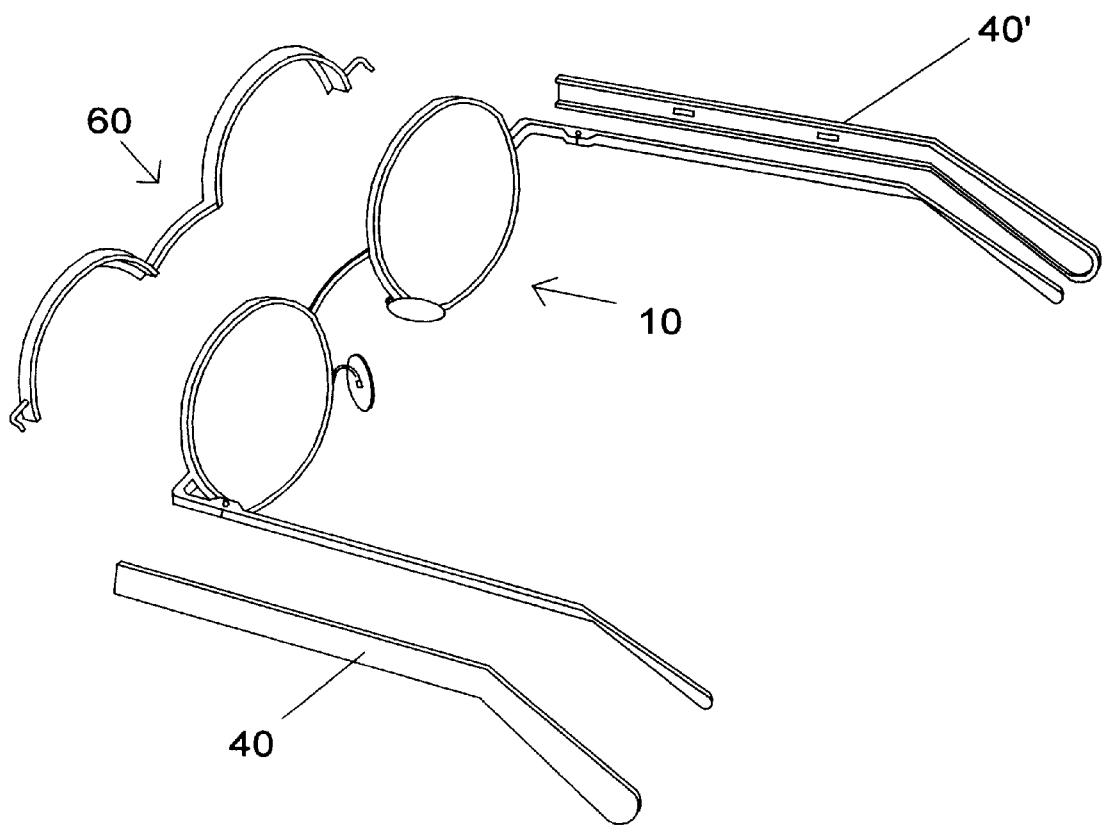

FIG. 8 adds to FIG. 1 left and right temple coverlets 40, 40' from my U.S. Pat. No. 6,089,707. This set of the invention couples conversion of the top eye rims of the primary eyeglasses with conversion also of its temples. The frames are converted to give a look competitive with eyeglasses such as the Cafe Ole and BCBG MAXAZRIA styles, where the top eye rims and temples are thicker than the bottom eye rims. The styles Cafe Ole and BCBG MAXAZRIA appear, respectively, at pages 86 and 107 of the trade magazine 20/20, Aug. 2000, Vol. 27, Issue 9, a Jobson Publication, New York, N.Y.

Figure 9:
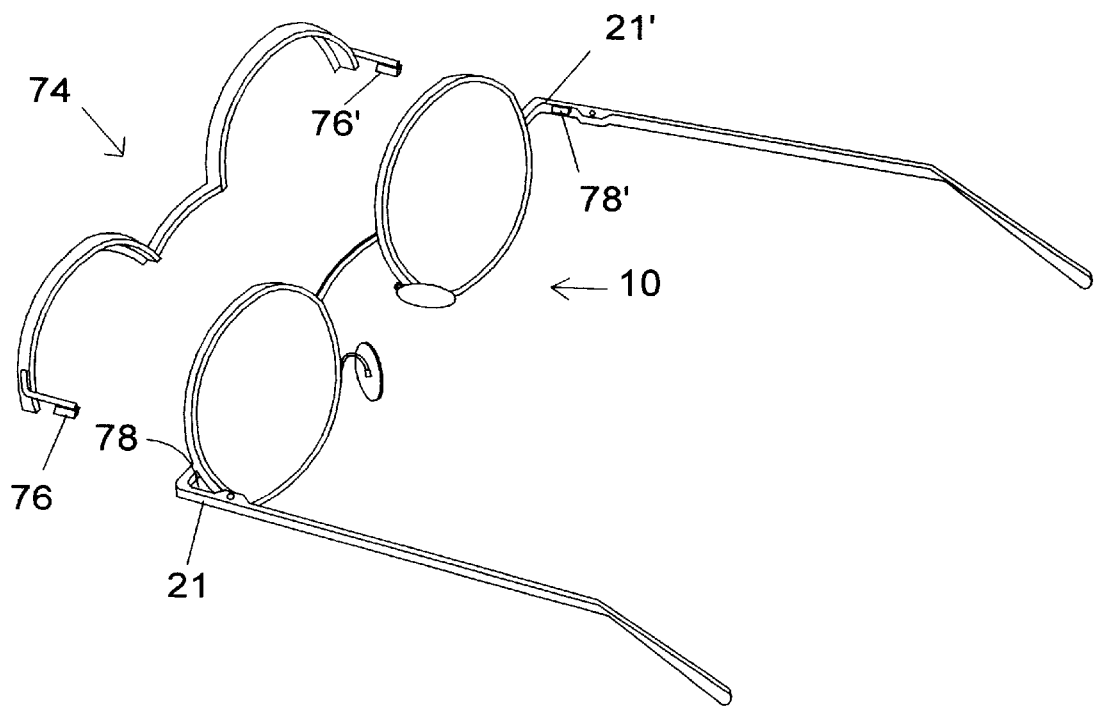
Figure 10:
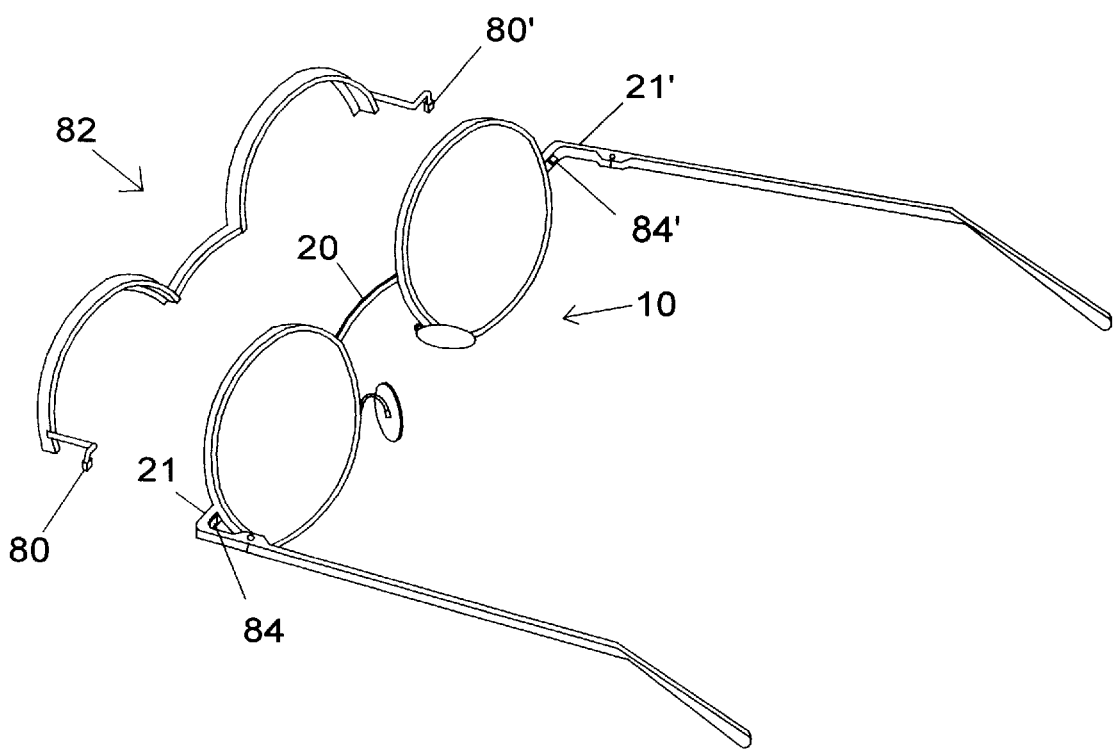

FIGS. 9 and 10 illustrate alternative structures for attaching cover clip-ons of the invention to a primary eyeglasses. Both of these structures are adapted from clip-on sunglasses. In FIG. 9, cover clip-on 74 carries permanent magnets 76,76' which cling to permanent magnets 78,78' in the temple-parallel legs of the end pieces 21,21'. For FIG. 10, the situation is only slightly different, in that the permanent magnets 80,80' of cover clip-on 82 cling to permanent magnets 84,84' in the front-portion-parallel legs of end pieces 21,21'. In both cases, the embodiment of FIG. 9 and that of FIG. 10, the magnetism is so strong that inter-hooking of the bridges is not required. For instance, the bridge of the clip-on of FIG. 9 may simply extend parallel to bridge section 20, without hooking over or under it. Alternatively, the bridge of the clip-on of FIG. 10, for example, may hook over and engage bridge section 20, to stabilize the central section.

Figure 11:
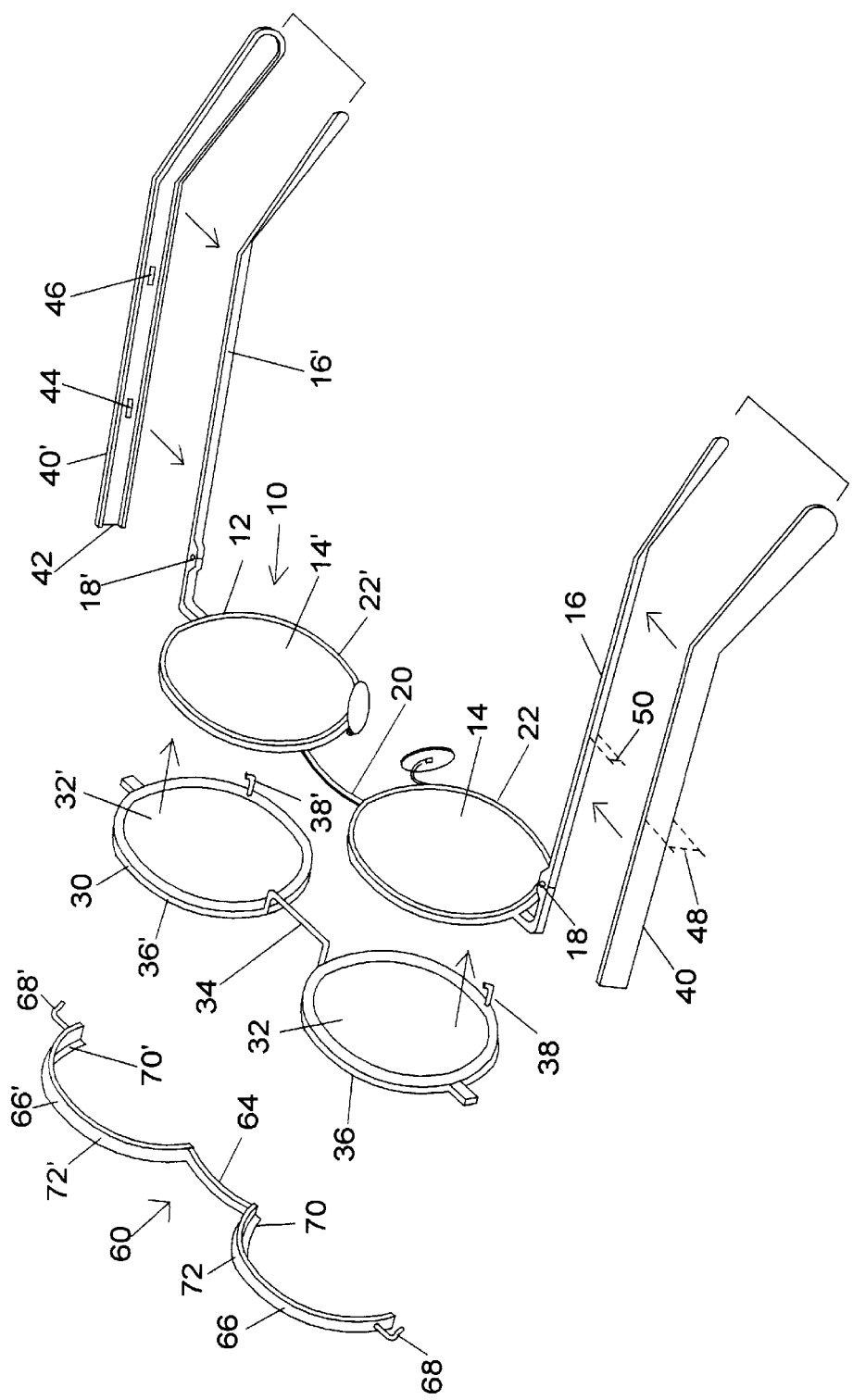

FIG. 11 shows a set of eyewear including a primary eyeglasses with a frame 10, a sunglasses clip-on with a frame 30, both from my U.S. Pat. No. 6,089,707, combined with a cover clip-on 60 from FIG. 1.

It is to be understood that the above are merely preferred modes of carrying-out the invention and that various changes and alterations can be made without departing from the spirit and broader aspects of the invention as defined by the claims set forth below and by the range of equivalency allowed by law. For instance, while the frontal lips and roofs on the cover clip-ons are shown to join angularly to one another, it is recognized that they may also be made to merge continuously into one another.

What is claimed is:

1. For a primary eyeglasses having a primary frame with top eye rim sections, a cover clip-on for the top eye rim sections, the cover clip-on being in the form of a strip having two top eye rim cover sections interconnected by a bridge, the bridge comprising a bridge clip, the strip further having retainer clips at its ends, the strip being bendable resiliently for assembling with spring tension onto the primary frame.

2. A cover clip-on as claimed in claim 1, the primary frame having a bridge section and end pieces, the bridge clip being underneath the bridge section and the retainer clips hooking over the end pieces when the strip is assembled with the primary frame.

3. A cover clip-on as claimed in claim 1, the primary frame having a bridge section and end pieces, the bridge clip hooking under the bridge section and the retainer clips hooking over the end pieces when the strip is assembled with the primary frame.

4. A set of eyewear comprising a primary eyeglasses having a primary frame with top eye rim sections, and a cover clip-on for the top eye rim sections, the cover clip-on being in the form of a strip having two top eye rim cover sections interconnected by a bridge, the bridge comprising a bridge clip, the strip further having retainer clips at its ends, the strip being bendable resiliently for assembling with spring tension onto the primary frame.

5. A set of eyewear as claimed in claim 4, the primary frame having a bridge section and end pieces, the bridge clip being underneath the bridge section and the retainer clips hooking over the end pieces when the strip is assembled with the primary frame.

6. A set of eyewear as claimed in claim 4, the primary frame having a bridge section and end pieces, the bridge clip hooking under the bridge section and the retainer clips hooking over the end pieces when the strip is assembled with the primary frame.

7. A cover clip-on in the form of a strip having top eye rim cover sections (66,66') interconnected by a bridge, the bridge comprising a bridge clip (64), the strip further having retainer clips (68,68') at its ends.

8. For a primary eyeglasses having a primary frame with top eye rim sections, a cover clip-on for the top eye rim sections, the cover clip-on being in the form of a strip having two top eye rim cover sections interconnected by a bridge, the strip having a permanent magnet, the primary frame having a permanent magnet, the strip assembling onto the primary frame with a clinging of the permanent magnet of the strip to the permanent magnet of the primary frame.

* * * * *